No. 709,509. Patented Sept. 23, 1902.
J. H. POLLARD.
BOILER TUBE CUTTER.
(Application filed June 4, 1902.)
(No Model.)
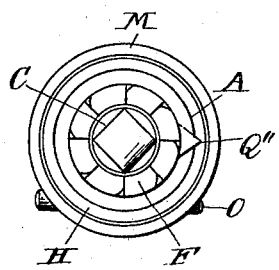
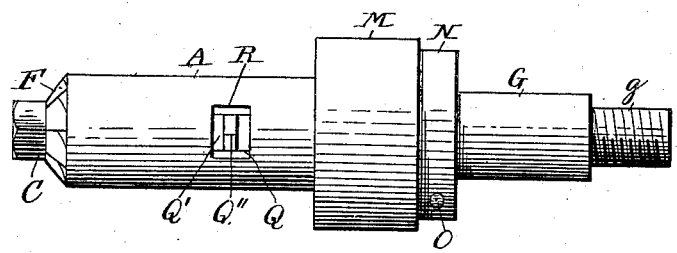
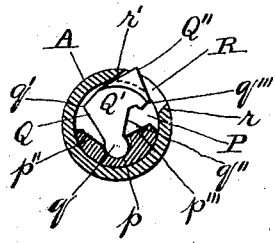
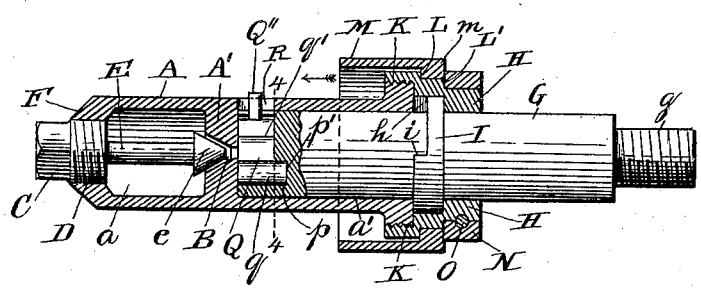

United States Patent Office.

JOHN HENRY POLLARD, OF CENTRALIA, ILLINOIS.

BOILER-TUBE CUTTER.

SPECIFICATION forming part of Letters Patent No. 709,509, dated September 23, 1902.

Application filed June 4, 1902. Serial No. 110,222. (No model.)

*To all whom it may concern:*

Be it known that I, JOHN HENRY POLLARD, a citizen of the United States, residing at Centralia, in the county of Marion and State of Illinois, have invented certain new and useful Improvements in Boiler-Tube Cutters, of which the following is a specification.

My invention relates to machines for cutting boiler-tubes, and has for one of its objects to provide a device that will cut the tubes from the inside and so arranged that when turned in one direction the cutting-blade will be projected, while when turned in the opposite direction the blade will be concealed in the casing of the device.

Another object of my invention is to provide means for automatically lubricating the cutting-blade and the tube while being cut.

Additional advantages of my invention will more fully appear hereinafter and by reference to the accompanying drawings, in which—

Figure 1 is a view of the exterior of my cutter; Fig. 2, a longitudinal sectional view showing a portion of the driving-spindle in elevation; Fig. 3, an end view; and Fig. 4, a cross-section of Fig. 2 on the line 4 4, taken in the direction of the arrow.

Referring to the drawings, in which similar reference characters indicate corresponding parts throughout the several views, A represents the casing of my device, which is divided into two chambers $a$ and $a'$ by the partition A'. The chamber $a$ is designed for an oil-chamber and is connected with the chamber $a'$ by means of a valve-port B.

C represents a valve-plug which is screw-threaded to fit into the screw-threaded aperture D in the end of the casing A and is designed to be removed when it is desired to replenish the oil in chamber $a$.

E is a stem secured to plug C and having a conical-shaped head $e$ to fit the valve-port B, this structure being designed to control the flow of the oil from chamber $a$ to chamber $a'$ by turning plug C.

The end of casing A surrounding the aperture D is made slanting and provided with left-hand cutting-facets F and is designed to act as a reamer in loosening dirt, rust, or any foreign accumulation from the ends of the boiler-tubes, so as to permit easy insertion of the cutting-tool.

The chamber $a'$, which will be called the "cutting-chamber" to distinguish it from the oil-chamber $a$, is made open at its end to receive the spindle G, which has its end $g$ formed to receive any preferred driving device, the drawings showing the end screw-threaded, though any other suitable form may be substituted. The spindle G is secured in the chamber $a'$ by means of the union H, fitting over the annular shoulder I on said spindle G and secured on the screw-threads K on the end of the casing A. The shoulder I is provided with a clutch $i$, which bears against the lug $h$ on the union H to cause a rotation of said union and casing when the spindle A is turned in the direction to bring said clutch $i$ and lug $h$ in contact. The exterior of the union H is formed with two shoulders L and L', as shown in Fig. 2, the shoulder L being designed to receive the flange $m$ on the sleeve M, which rests against the flue-sheet while the cutting-blade, hereinafter described, is cutting the boiler-tube, N representing a ring resting against the top of the sleeve M and the shoulder L' and secured to the union H by means of the pin O to hold the said sleeve M in place.

The end of the spindle G is recessed, as shown at P, to receive the cutting-blade Q, the bottom of said recess being formed with a circular portion $p$, as shown in Fig. 4, which penetrates the wall of the recess P, as shown at $p'$ in Fig. 2, said circular portions $p$ and $p'$ being designed to receive the circular head $q$ of the cutter Q, so that it is journaled therein. The body of the cutter Q is formed with a heavy body portion Q' and a narrowed cutting edge and point Q'', the left side of the body portion Q being angular in cross-section, as shown at $q'$, while the right side is formed with a substantially rectangular recess $q''$, which begins at the circular head $q$ and extends nearly to the outer portion of the body of the cutter Q, thus leaving a projecting tooth $q'''$, which when the spindle G is turned toward the right bears against the abrupt edge $r$ of the slot R in the casing A and pushes the cutting-point Q'' out into engagement with the tube to be cut, the opposite edge $r'$ of said slot R being formed with an inwardly-slanting surface to permit the withdrawal of the cutting-blade inside the chamber $a'$ when the spindle G is turned back toward the left after the tube has been cut. The base of the recess P is formed with a projecting portion $p''$, that bears against the angular side $q'$ of the cutting-blade Q in forcing the blade out of the slot R, and a substantially rectangular portion $p'''$ to fit into the rectangular recess $q''$ in said blade in withdrawing the blade into the chamber $a'$.

It will be understood from the above description that by rotating the spindle G toward the left and inserting the casing A in the tube to be cut any foreign substances that may have accumulated in the end of the tube are cut away to permit insertion of the tool in the tube. The spindle is then turned toward the right, which causes the cutting-blade to be projected from the casing A through the slot R, as above described, and a continuation of the rotation of the spindle toward the right causes the clutch $i$ to bear against the lug $h$, turning the casing and cutting-blade and cutting the boiler-tube at the point desired. While cutting the tube oil is fed to the cutting-blade to assist in the operation through the valve-port B. After the tube has been cut the spindle is rotated in a reverse direction, by which operation the cutting-blade is withdrawn into the chamber $a'$ and the device may be removed from the severed tube.

Having thus described my invention, what I claim is—

1. In a boiler-tube cutter, a casing containing the cutting mechanism, the end of said casing formed with a slanting surface, and cutting-facets on said slanting surface, substantially as shown and described.

2. In a boiler-tube cutter, a casing formed with two communicating chambers, one chamber containing the cutting device, the other chamber containing oil and a screw-plug valve inserted in a screw-threaded bore in the end of the casing, substantially as shown and described.

3. In a boiler-tube cutter, a casing formed with two chambers by a partition having a valve-port, one of said chambers containing the cutting device, the other chamber containing oil, and a screw-plug valve inserted in a screw-threaded bore in the end of said casing having a head to register with said valve-port to control the flow of oil to the cutting-blade, substantially as shown and described.

4. In a boiler-tube cutter, a spindle having a recess in its end provided with a circular journal-bearing, a cutting-blade having a heavy body portion and a narrow cutting edge, one side of said body portion having an angular face, the other side having a recess therein, the base of the recess on said spindle having a surface to bear against the angular surface of said body portion in projecting the blade, and with a part to fit into the recess on the other side of the blade, substantially as shown and described.

5. In a boiler-tube cutter, the combination of a casing having two chambers separated by a valved partition and a slot in the wall of one chamber, a spindle rotatably mounted in said slotted chamber, a cutting-blade journaled on said spindle, and means to force the cutting-blade out of said slot and return it to its normal position, substantially as shown and described.

6. In a boiler-tube cutter, the combination of a casing having two chambers therein separated by a valved partition, one of said chambers having a slot in its wall, a spindle rotatably mounted in said slotted chamber, a cutting-blade journaled in said spindle, said cutting-blade having an angular edge and a recessed edge, and the spindle formed to bear against said angular edge to project the blade, and to fit into said recess to retract it, substantially as shown and described.

7. In a boiler-tube cutter, a casing having two chambers separated by a valved partition, a spindle rotatably mounted in one of said chambers, a cutting-blade journaled in the end thereof, a shoulder on said spindle, a clutch on said shoulder, a union fitting said spindle and shoulder and secured to the edge of the casing, and a lug on said union against which said clutch bears to turn the casing in cutting a tube, substantially as shown and described.

8. In a boiler-tube cutter, a spindle having a recess in its end provided with a journal-bearing, a cutting-blade mounted in said recess having a head to fit into said journal-bearing, a casing having two chambers separated by a valved partition, one of said chambers adapted to receive the end of said spindle and having a slot through which said cutting-blade extends in cutting a tube, an annular shoulder on said spindle, a clutch on said shoulder, a union fitting said spindle and shoulder and secured to the edge of the casing, and a lug on said union against which said clutch bears to turn the casing in cutting a tube, substantially as shown and described.

In testimony whereof I hereto affix my signature in the presence of two witnesses.

JOHN HENRY POLLARD.

Witnesses:
FRANK F. NOLEMAN,
BELLA M. JAMES.